(12) United States Patent
Takatsuki

(10) Patent No.: US 6,320,701 B1
(45) Date of Patent: Nov. 20, 2001

(54) REAR-FOCUS-TYPE ZOOM LENS

(75) Inventor: Akiko Takatsuki, Omiya (JP)

(73) Assignee: Fuji Photo Optical Co., Ltd., Omiya (JP)

( * ) Notice: Subject to any disclaimer, the term of this patent is extended or adjusted under 35 U.S.C. 154(b) by 0 days.

(21) Appl. No.: 09/525,856

(22) Filed: Mar. 14, 2000

(30) Foreign Application Priority Data

Mar. 18, 1999 (JP) .................................................. 11-073723

(51) Int. Cl.$^7$ .................................................. G02B 15/14
(52) U.S. Cl. .................................................. 359/684; 359/687
(58) Field of Search .................................... 359/684, 687

(56) References Cited

U.S. PATENT DOCUMENTS

| | | | | |
|---|---|---|---|---|
| 5,530,592 | * | 6/1996 | Tochigi | 359/687 |
| 5,963,378 | * | 10/1999 | Tochigi et al. | 359/687 |
| 6,215,599 | * | 4/2001 | Ohtake | 359/684 |

FOREIGN PATENT DOCUMENTS

| | | | |
|---|---|---|---|
| 5-88083 A | 4/1993 | (JP) | . |
| 9-281393 A | 10/1997 | (JP) | . |
| 10-282414 A | 10/1998 | (JP) | . |
| 3-12619-A | * 1/1991 | (JP) | 359/684 |
| 3-12620-A | * 1/1991 | (JP) | 359/684 |
| 3-12621-A | * 1/1991 | (JP) | 359/687 |
| 5-60971-A | * 3/1993 | (JP) | 359/687 |
| 5-60972-A | * 3/1993 | (JP) | 359/687 |
| 5-93861-A | * 4/1993 | (JP) | 359/687 |
| 5-93862-A | * 4/1993 | (JP) | 359/687 |
| 5-288991-A | * 11/1993 | (JP) | 359/687 |

* cited by examiner

Primary Examiner—Evelyn A Lester
(74) Attorney, Agent, or Firm—Arnold International; Bruce Y. Arnold

(57) ABSTRACT

A rear-focus-type zoom lens having, in order from the object side, four lens groups of positive, negative, positive, and positive power, wherein the first lens group $G_1$ and the third lens group $G_3$ are fixed and the second lens group $G_2$ and the fourth lens group $G_4$ are moved during zooming. Focusing is accomplished by moving the fourth lens group $G_4$. The first lens group $G_1$ is formed of a negative lens element $L_1$ and positive lens element $L_2$ that are joined together, and a positive lens element $L_3$. The second lens group $G_2$ is formed of, in order from the object side, a negative lens element $L_4$ and a lens formed of a negative lens element $L_5$ and a positive lens element $L_6$ that are joined. The third lens group $G_3$ is formed of a single lens element $L_7$, and the fourth lens group $G_4$ is formed, in order from the object side, of positive, negative, positive, and positive lens elements $L_8$–$L_{11}$, respectively. Further, specified conditions are satisfied.

9 Claims, 13 Drawing Sheets

REAR-FOCUS-TYPE ZOOM LENS

BACKGROUND OF THE INVENTION

Conventionally, as a zoom lens of a video cameras and the like, a rear-focus-type zoom lens is known that performs focusing by moving a lens group other than the first lens group on the object side. In general, a rear-focus-type zoom lens enables the first lens group to have a smaller effective diameter as compared to those zoom lenses that perform focusing by moving the first lens group, thus enabling the zoom lens to be miniaturized. Furthermore, because a rear-focus-type Zoom lens performs focusing by moving a relatively compact, light-weight lens group, the driving force to move the lens group can be small, resulting in this type of zoom lens being able to perform focusing rapidly.

As such a zoom lens, for example, there are lens systems as described in Japanese Laid Open Application H5-88083 and Japanese Laid Open Patent Application H9-281393. In these zoom lenses, a first lens group with positive refractive power, a second lens group with negative refractive power, a third lens group with positive refractive power, and a fourth lens group with positive refractive power are sequentially arranged, in order from the object side. Zooming is accomplished by moving the second lens group, and correction for what otherwise would result in shifting of the image surface is accomplished by moving the fourth lens group.

As stated above, by adopting the rear focus method in a zoom lens, the zoom lens can be miniaturized, and also rapid focusing becomes possible. However, in a rear-focus-type zoom lens, a problem occurs in that aberration changes during zooming and focusing become large and it becomes difficult to maintain high optical performance over all object distances from nearby to infinity. To deal with this kind of problem, as a rear-focus-type zoom lens that has a favorable optical performance over the entire range of object distances, has a wide angle of view, and yet is compact, there has been disclosed a zoom lens as described in Japanese Laid Open Patent Application H10-282414, for example. However, whereas the zoom lens described therein proposes to realize miniaturization and weight reduction with a relatively small number of component lens elements, namely 11 lens elements in four lens groups, the zoom ratio is low, being only about 3x. Thus, a zoom lens with a higher zoom ratio is desired.

BRIEF SUMMARY OF THE INVENTION

This invention relates to a rear-focus-type zoom lens, especially a large-diameter zoom lens with a zoom ratio of nearly 10x and having a favorable optical performance for use in a video camera, and so on. The object of the present invention is to provide a rear-focus-type zoom lens having a high zoom ratio that can favorably correct the various aberrations over the entire zooming range and the entire range of object distances, even when the diameter of the first lens element is made to be large.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

The present invention is a rear-focus-type zoom lens where, in order from the object side, the first lens group $G_1$ has positive refractive power, the second lens group $G_2$ has negative refractive power, the third lens group $G_3$ has positive refractive power, and the fourth lens group $G_4$ has positive refractive power. The first lens group $G_1$ and the third lens group $G_3$ are fixed relative to the image surface, and zooming is accomplished by moving the second lens group $G_2$ and the fourth lens group $G_4$ along the optical axis. Furthermore, focusing is accomplished by moving the fourth lens group $G_4$ along the optical axis.

The first lens group $G_1$ is formed, in order from the object side, of a lens made of a negative lens element joined to a positive lens element and of another lens with positive refractive power. The second lens group $G_2$ is formed, in order from the object side, of a lens element having negative refractive power and a lens formed of a negative lens element joined to a positive lens element. The third lens group $G_3$ is formed of a single lens element, and the fourth lens group $G_4$ is formed, in order from the object side, of a lens element with positive refractive power, a lens element with negative refractive power, a lens element with positive refractive power, and a lens element with positive refractive power. Further, the following Conditions (1)–(4) are satisfied

| | |
|---|---|
| $Z > 9.5$ | Condition (1) |
| $0.4 < \|f_2/(f_W \times f_T)^{0.5}\| < 0.64$ | Condition (2) |
| $1.0 < f_3/f_4 < 6.0$ | Condition (3) |
| $-0.25 < f_T/F_{T123} < 0.50$ | Condition (4) | where

Z is the zoom ratio, (i.e. $f_T/f_W$)

$f_2$ is the focal distance of the second lens group, $f_3$ is the focal distance of the third lens group, $f_4$ is the focal distance of the fourth lens group, $f_W$ is the focal distance of the zoom lens at the wide-angle end, $f_T$ is the focal distance of the zoom lens at the telephoto end, and $F_{T123}$ is the composite focal distance of the first, second, and third lens groups at the telephoto end.

Figure 1:
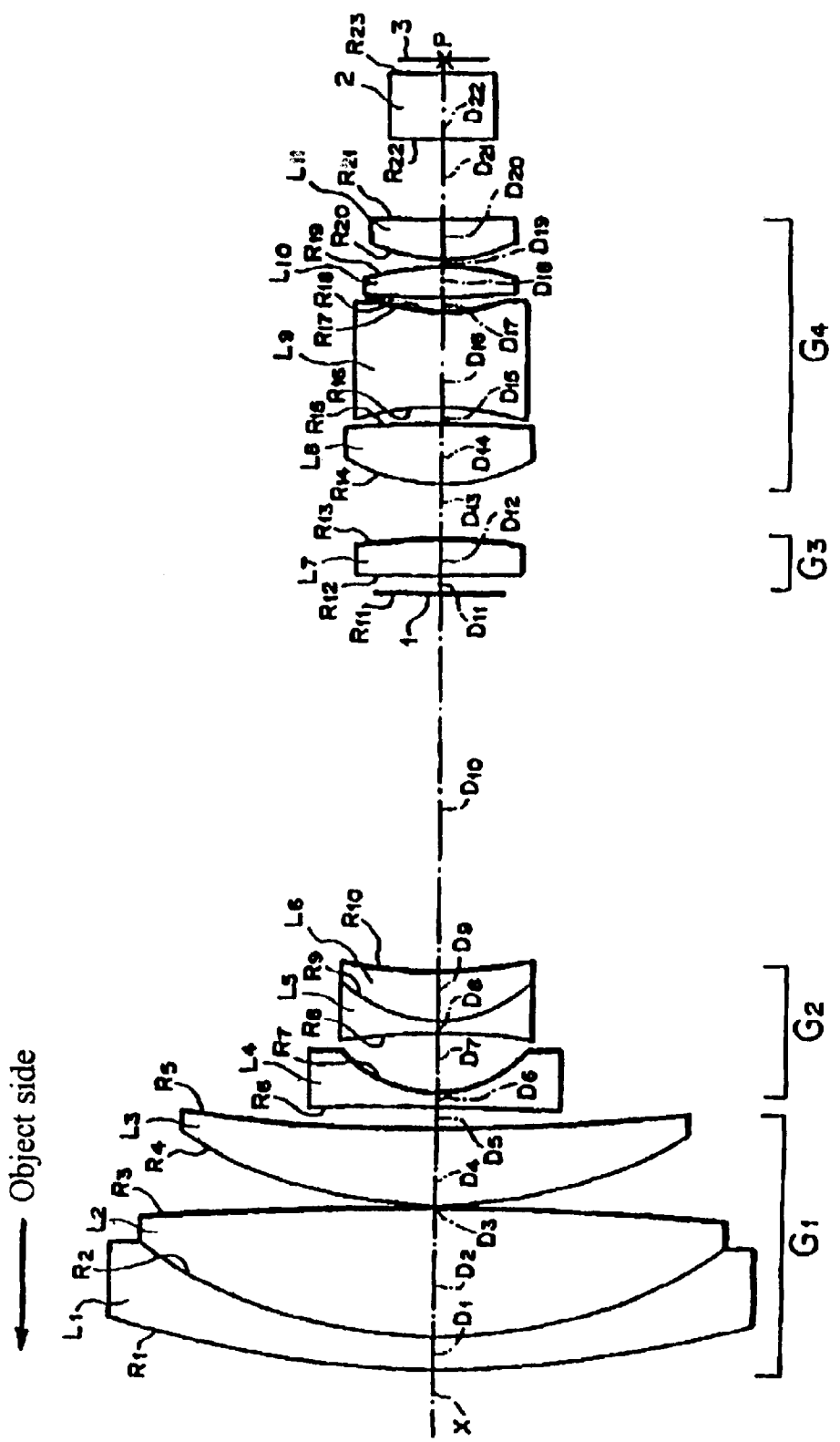
FIG. 1 shows the lens element construction of the rear-focus-type zoom lens of Embodiment 1.

The invention will now be explained in detail with reference to the drawings. FIG. 1 shows the lens element construction of a rear-focus-type zoom lens according to the present invention. As shown in FIG. 1, in the rear-focus-type zoom lens of this embodiment the following lens groups are arranged sequentially in order from the object side: a first lens group $G_1$ with positive refractive power, a second lens group $G_2$ with negative refractive power, a third lens group $G_3$ with positive refractive power, and a fourth lens group $G_4$ with positive refractive power. Also, a stop 1 is arranged between the second lens group $G_2$ and the third lens group $G_3$, and a filter section 2 consisting of a cut-off filter, etc., is arranged on the image side of the fourth lens group $G_4$. Light flux incident along the optical axis X from the object side is imaged at the image-forming position P of image surface 3 of a solid-state imaging element (CCD).

In zooming from the wide-angle end to the telephoto end, the first lens group $G_1$ and the third lens group $G_3$ are fixed relative to the image surface, and the second lens group $G_2$ and the fourth lens group $G_4$ move along the optical axis. Furthermore, focusing is accomplished by moving the fourth lens group $G_4$ along the optical axis.

The first lens group $G_1$ is formed of, in order from the object side, a first lens element $L_1$ of negative meniscus shape with its convex surface on the object side, a second lens element $L_2$ that is biconvex, and a third lens element $L_3$ of positive meniscus shape with its convex surface on the object side. The first lens element $L_1$ and the second lens element $L_2$ are joined to form a single lens.

The second lens group $G_2$ is formed of, in order from the object side, a fourth lens element $L_4$ that is biconcave, a fifth lens element $L_5$ that is biconcave, and a sixth lens element $L_6$ of positive meniscus shape with its convex surface on the object side. The fifth lens element $L_5$ and the sixth lens element $L_6$ are joined to form a single lens.

The third lens group $G_3$ is formed of a seventh lens element $L_7$ of positive refractive power.

The fourth lens group $G_4$ is formed of, in order from the object side, an eighth lens element $L_8$ that has positive refractive power, a ninth lens element $L_9$ that is biconcave, a tenth lens element $L_{10}$ that is biconvex, and an eleventh lens element $L_{11}$ that has positive refractive power. Also, the zoom lens of this embodiment is constructed so that it satisfies the above Conditions (1)–(4).

Conditions (1)–(4) will now be are explained. Condition (1) regulates the zoom ratio. By satisfying Condition (1), a zoom lens can be made to have a high zoom ratio of nearly 10×, for example.

Condition (2) regulates refractive power of the second lens group $G_2$ as compared to the geometric mean refractive power of the zoom lens at the wide-angle and telephoto end. If the Condition (2) value exceeds the upper limit, the amount of movement of the second lens group $G_2$ increases, making the total lens length too long for miniaturization. On the other hand, if the Condition (2) value falls below the lower limit, aberrations due to zooming become large, making it impossible to maintain favorable optical performance.

Condition (3) regulates refractive power $f_3$ of the third lens group $G_3$ versus the refractive power $f_4$ of the fourth lens group $G_4$. By regulating the ratio of $f_3/f_4$ between the listed values, miniaturization of the stop 1 and all the lens elements that follow in the optical path is achieved and favorable optical performance is maintained.

If the ratio of $f_3/f_4$ falls below the lower limit of Condition (3), the focal distance of the third lens group $G_3$ becomes short and correction for spherical aberration due to zooming or focusing becomes difficult. Also, providing a sufficient back focus becomes difficult. Furthermore, when the amount of movement of the fourth lens group $G_4$ becomes large, the aberrations when zooming/focusing tend to become large.

On the other hand, if the ratio of $f_3/f_4$ exceeds the upper limit of Condition (3), the focal distance of the third lens group $G_3$ becomes long, dispersion of light having transited the third lens group $G_3$ becomes excessive and the effective diameter of the fourth lens group $G_4$ becomes large. Therefore, the fourth lens group $G_4$ becomes heavy. Because this is the lens group that is moved for focusing, it becomes impossible to focus rapidly and smoothly.

Condition (4) regulates composite focal distance from the first lens group $G_1$ to the third lens group $G_3$ at the telephoto end, and regulates the ratio $f_T/F_{T123}$ (i.e., the focal distance of the zoom lens at the telephoto end divided by the composite focal distance at the telephoto end of the composite lens system formed of the lens groups $G_1$ through $G_3$).

If the ratio of $f_T/F_{T123}$ exceeds the upper limit of Condition (4), the degree of convergence of on-axis light flux incident to the fourth lens group $G_4$ becomes strong, resulting in increased astigmatism. On the other hand, if the ratio $f_T/F_{T123}$ falls below the lower limit of Condition (4), the degree of dispersion of on-axis light incident to the fourth lens group $G_4$ becomes strong, making correction of spherical aberration due to the fourth lens group difficult.

Embodiment 1

FIG. 1 shows the basic lens element construction of a rear-focus-type zoom lens according to Embodiment 1. In this embodiment, the seventh lens element $L_7$ is of positive meniscus shape with its convex surface on the image side, the eighth lens element $L_8$ is biconvex, and the eleventh lens element $L_{11}$ is of positive meniscus shape with its convex surface on the object side.

Listed in the top portion of Table 1 are the surface number # in order from the object side, the radius of curvature R (in mm) of each surface, the on-axis surface spacing D (in mm), as well as the index of refraction $N_d$ and the Abbe number $v_d$ (at the sodium d line) of each lens element of Embodiment 1. Listed in the middle portion of Table 1 are the focal distance f (in mm), the f-number $F_{NO}$ and the back focus Bf (in mm). Furthermore, listed in the bottom portion of Table 1 are the values corresponding to Conditions (1)–(4).

TABLE 1

| # | R | D | $N_d$ | $v_d$ |
|---|---|---|---|---|
| 1 | 75.79 | 2.40 | 1.84665 | 23.9 |
| 2 | 35.216 | 9.73 | 1.51680 | 64.2 |
| 3 | −281.314 | 0.20 | | |
| 4 | 34.092 | 5.61 | 1.77250 | 49.6 |
| 5 | 151.397 | 1.54–27.92 | | |
| 6 | −189.542 | 1.00 | 1.83480 | 42.7 |
| 7 | 10.061 | 4.19 | | |
| 8 | −46.845 | 1.00 | 1.60311 | 60.6 |
| 9 | 9.78 | 3.52 | 1.84665 | 23.8 |
| 10 | 34.815 | 28.82–2.44 | | |
| 11 | ∞ (stop) | 1.20 | | |
| 12 | −227.517 | 2.38 | 1.84665 | 23.8 |
| 13 | −62.754 | 5.23–4.72 | | |
| 14 | 11.745 | 3.15 | 1.80400 | 46.6 |
| 15 | −101.48 | 0.48 | | |

TABLE 1-continued

| | | | | |
|---|---|---|---|---|
| 16 | −31.717 | 7.36 | 1.84665 | 23.8 |
| 17 | 10.212 | 1.95 | | |
| 18 | 36.137 | 2.40 | 1.75500 | 52.3 |
| 19 | −25.279 | 2.92 | | |
| 20 | 11.746 | 2.68 | 1.60311 | 60.6 |
| 21 | 925.271 | 0.00–0.51 | | |
| 22 | ∞ | 5.00 | 1.51680 | 64.2 |
| 23 | ∞ | | | | f = 5.15–49.43  $F_{NO}$ = 1.87  Bf = 7.02
Condition (1) value:  Z = 9.6
Condition (2) value:  $|f_2/(f_W \times f_T)^{1/2}|$ = 0.58
Condition (3) value:  $f_3/f_4$ = 5.9
Condition (4) value:  $f_T/F_{T123}$ = −0.21

Figure 2:
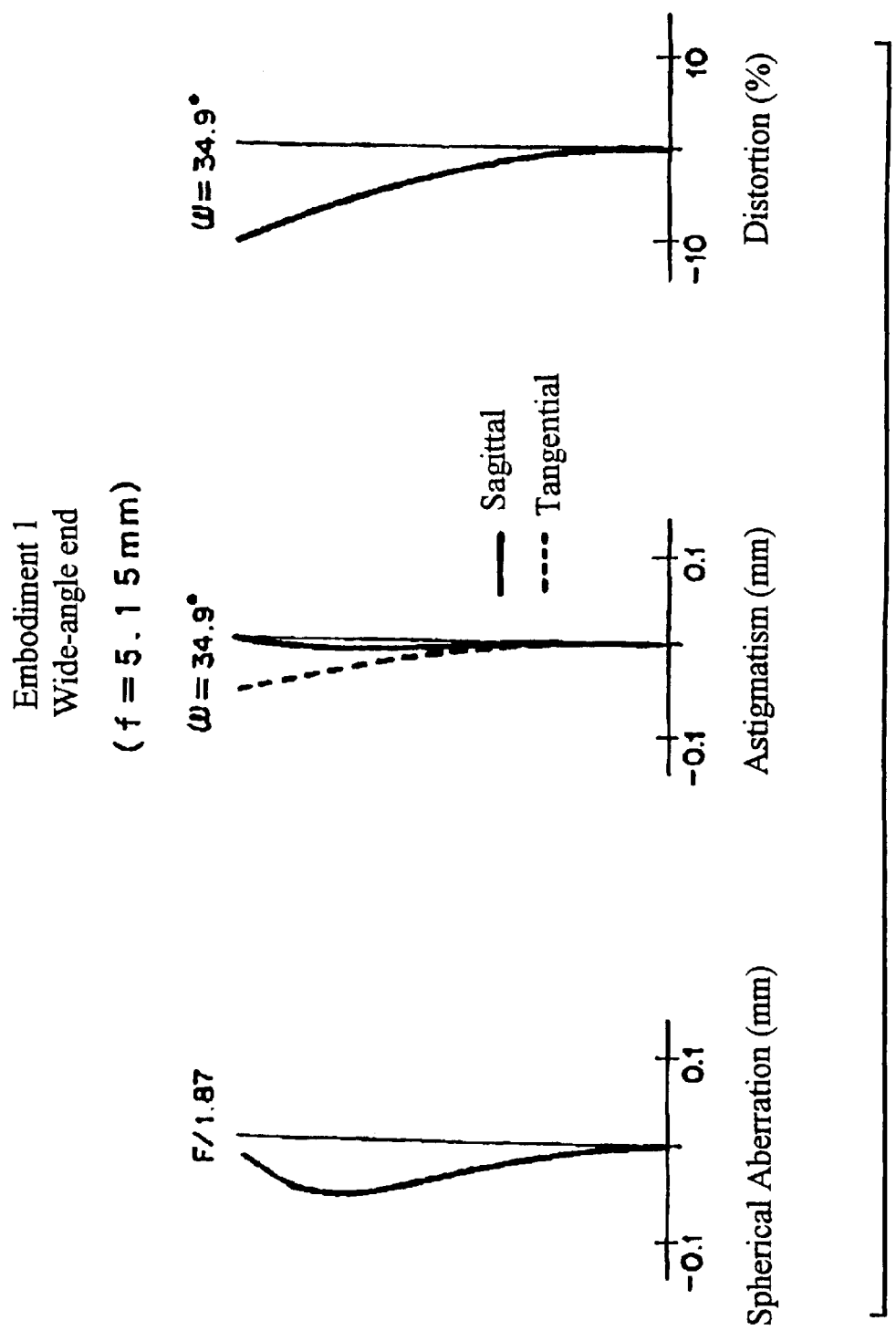
FIG. 2 illustrates aberrations at the wide-angle end of the rear-focus-type zoom lens of Embodiment 1.
Figure 3:
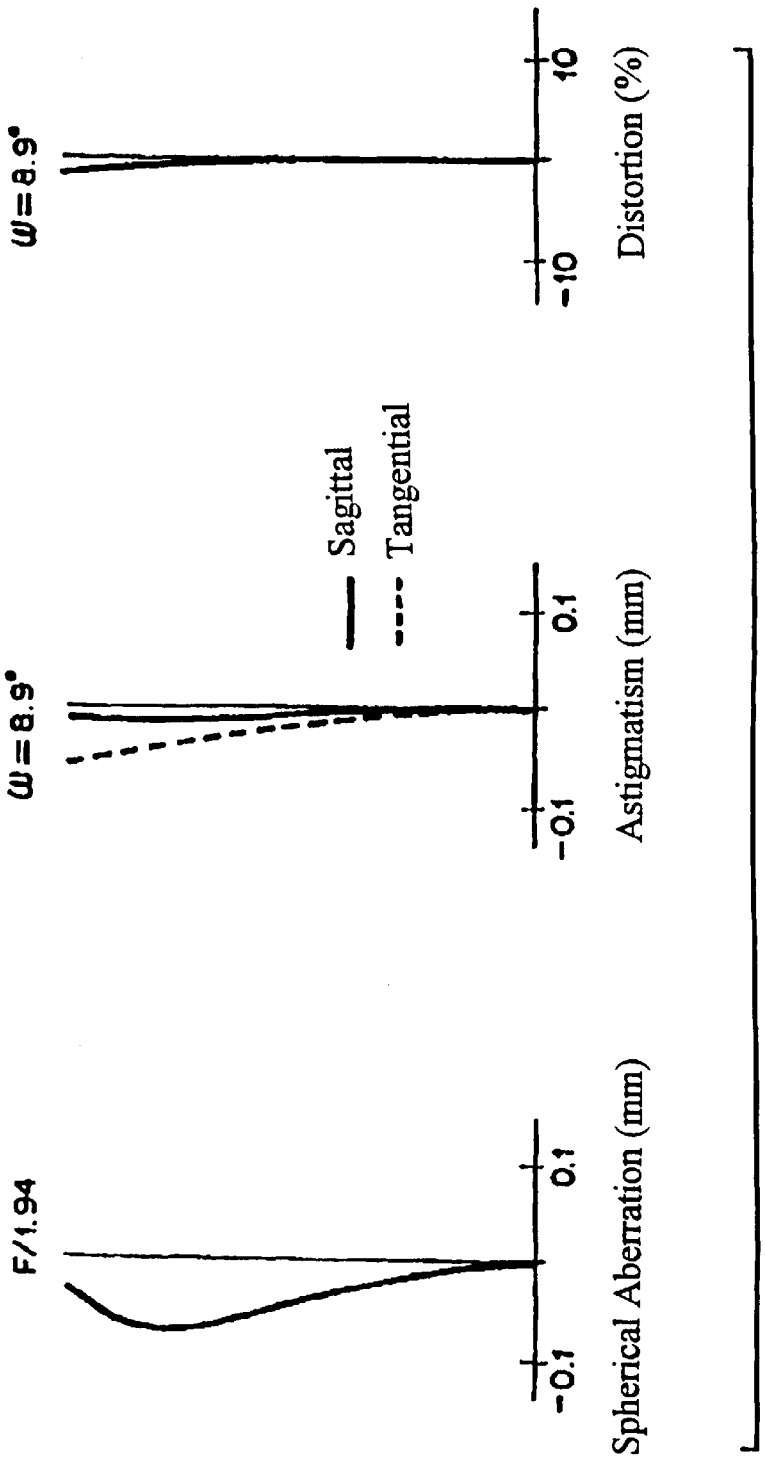
FIG. 3 illustrates aberrations at the middle position of the rear-focus-type zoom lens of Embodiment 1.
Figure 4:
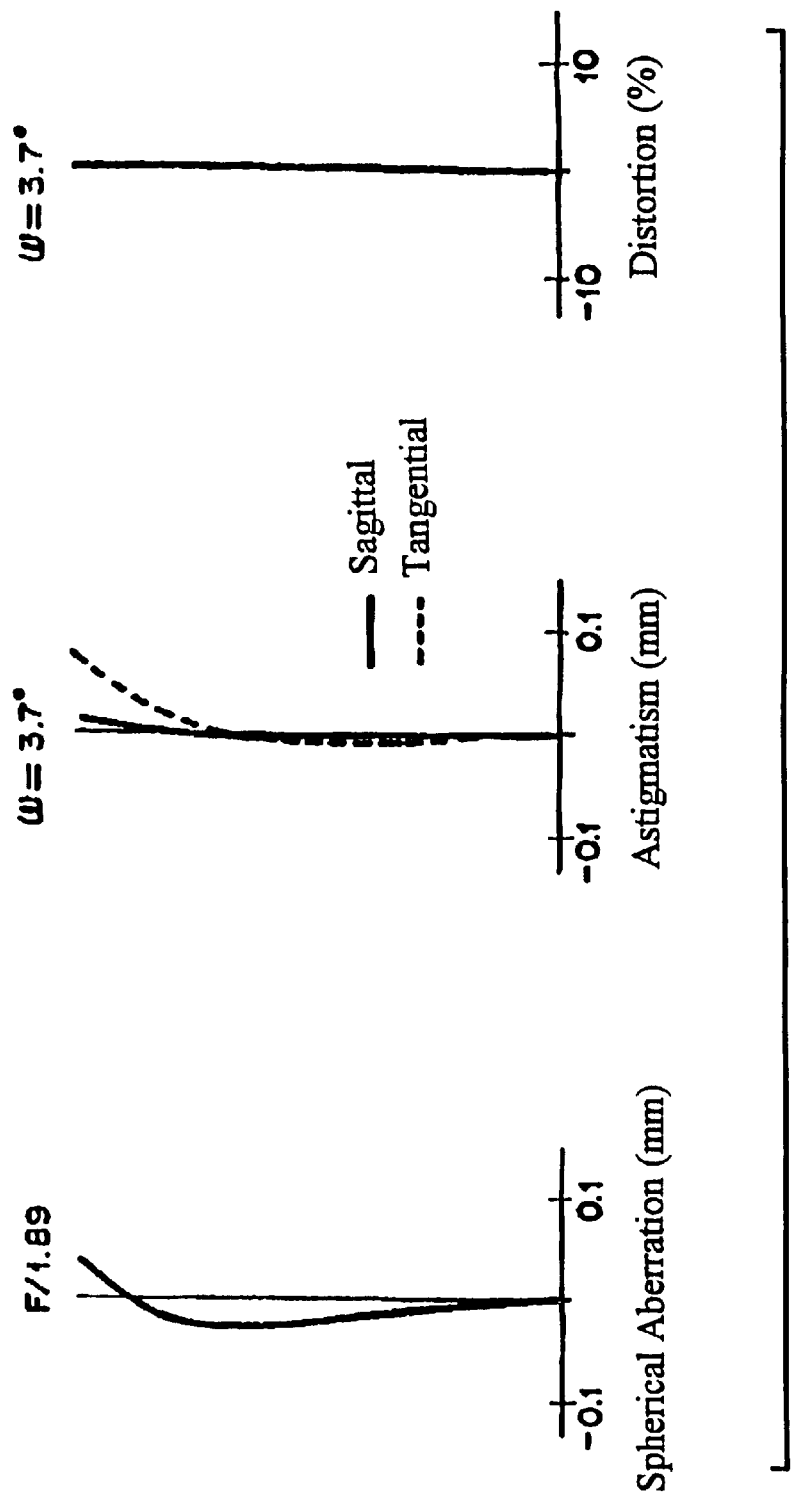
FIG. 4 illustrates aberrations at the telephoto end of the rear-focus-type zoom lens of Embodiment 1.

FIGS. 2–4 show the spherical aberration, astigmatism, and distortion of the rear-focus-type zoom lens of Embodiment 1, with FIG. 2 showing the various aberrations at the wide-angle end (f=5.15 mm), FIG. 3 showing the various aberrations at a middle position (f=20.60 mm), and FIG. 4 showing the various aberrations at the telephoto end (f=49.43 mm). The half-image angle is indicated by ω, and, in each aberration plot of astigmatism, curves are given for both the sagittal image plane and the tangential image plane.

As listed in Table 1 and shown in FIGS. 2–4, Embodiment 1 satisfies all of the Conditions (1)–(4), the focal distance f is from 5.15–49.43 mm and the f-number $F_{NO}$ is 1.87. And, the zoom ratio is as high as 9.6, thereby providing a high-performance, rear-focus-type zoom lens that forms a bright image with aberrations that are favorably corrected.

Embodiment 2

The lens element construction of Embodiment 2 is basically the same as in Embodiment 1, except that, in Embodiment 2, the seventh lens element $L_7$ of the third lens group $G_3$ is biconvex.

Listed in the top portion of Table 2 are the surface number # in order from the object side, the radius of curvature R (in mm) of each surface, the on-axis surface spacing D (in mm), as well as the index of refraction $N_d$ and the Abbe number $v_d$ (at the sodium d line) of each lens element of Embodiment 2. Listed in the middle portion of Table 2 are the focal distance f (in mm), the $F_{NO}$, and the back focus Bf (in mm). Furthermore, listed in the bottom portion of Table 2 are the values corresponding to Conditions (1)–(4).

TABLE 2

| # | R | D | $N_d$ | $v_d$ |
|---|---|---|---|---|
| 1 | 75.79 | 2.40 | 1.84665 | 23.9 |
| 2 | 35.216 | 9.73 | 1.51680 | 64.2 |
| 3 | −281.314 | 0.20 | | |
| 4 | 34.092 | 5.61 | 1.77250 | 49.6 |
| 5 | 147.899 | 1.54–28.32 | | |
| 6 | −527.962 | 1.00 | 1.80400 | 46.6 |
| 7 | 8.946 | 4.19 | | |
| 8 | −60.493 | 1.00 | 1.51823 | 58.9 |
| 9 | 9.475 | 3.52 | 1.84665 | 23.9 |
| 10 | 27.891 | 28.82–2.04 | | |
| 11 | ∞ (stop) | 1.20 | | |
| 12 | 480.683 | 2.78 | 1.74399 | 44.8 |
| 13 | −40.854 | 4.19–4.81 | | |
| 14 | 12.75 | 4.80 | 1.60738 | 56.8 |
| 15 | −71.065 | 0.89 | | |
| 16 | −23.499 | 7.49 | 1.84665 | 23.9 |
| 17 | 15.157 | 0.73 | | |
| 18 | 47.588 | 2.54 | 1.71299 | 53.8 |
| 19 | −17.019 | 0.40 | | |
| 20 | 12.029 | 2.83 | 1.63854 | 55.4 |
| 21 | 110.783 | 0.62–0.00 | | |
| 22 | ∞ | 5.00 | 1.51680 | 64.2 |

TABLE 2-continued

| | | | | |
|---|---|---|---|---|
| 23 | ∞ | | | | f = 5.19–49.81  $F_{NO}$ = 1.87  Bf = 5.81
Condition (1) value:  Z = 9.6
Condition (2) value:  $|f_2/(f_W \times f_T)^{0.5}|$ = 0.62
Condition (3) value:  $f_3/f_4$ = 3.1
Condition (4) value:  $f_T/F_{T123}$ = 0.04

Figure 5:
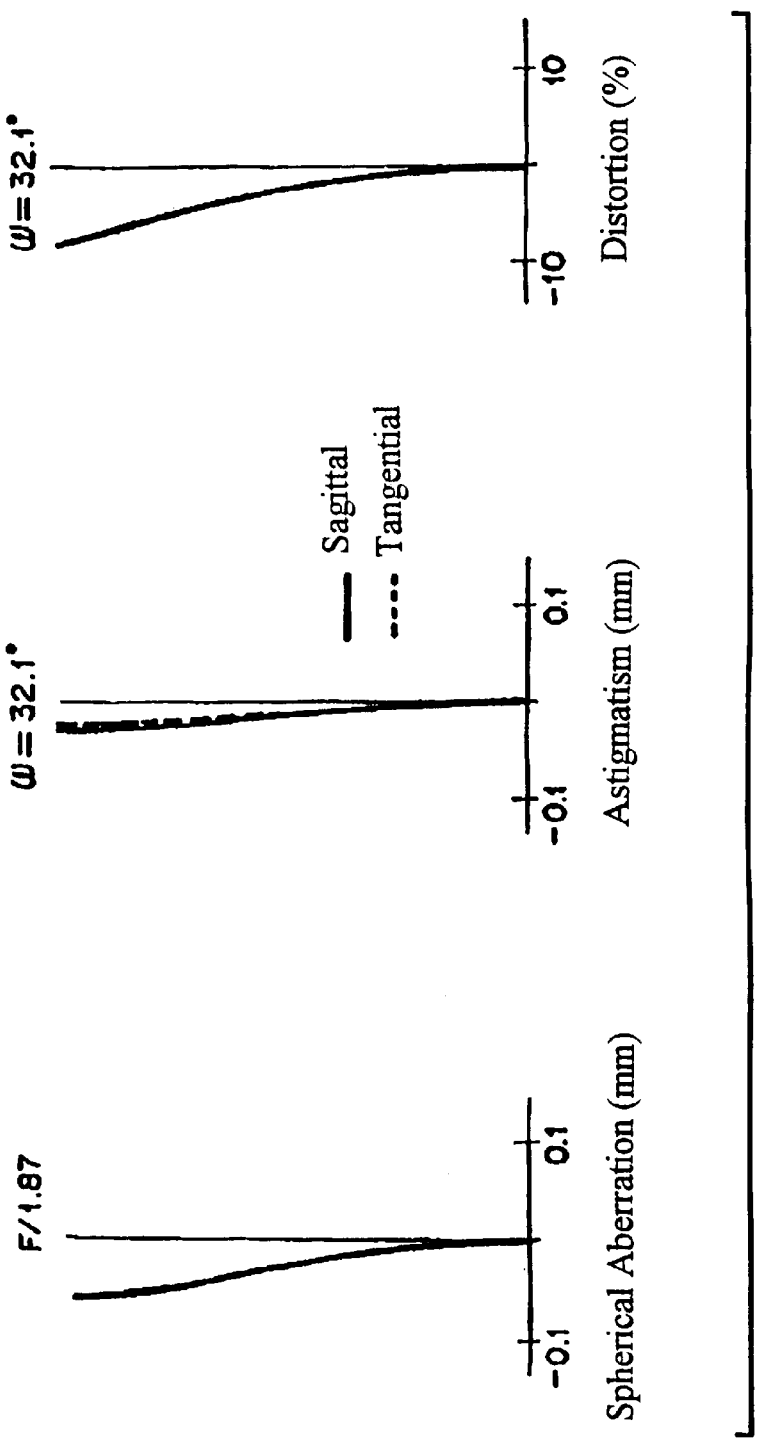
FIG. 5 illustrates aberrations at the wide-angle end of the rear-focus-type zoom lens of Embodiment 2.
Figure 6:
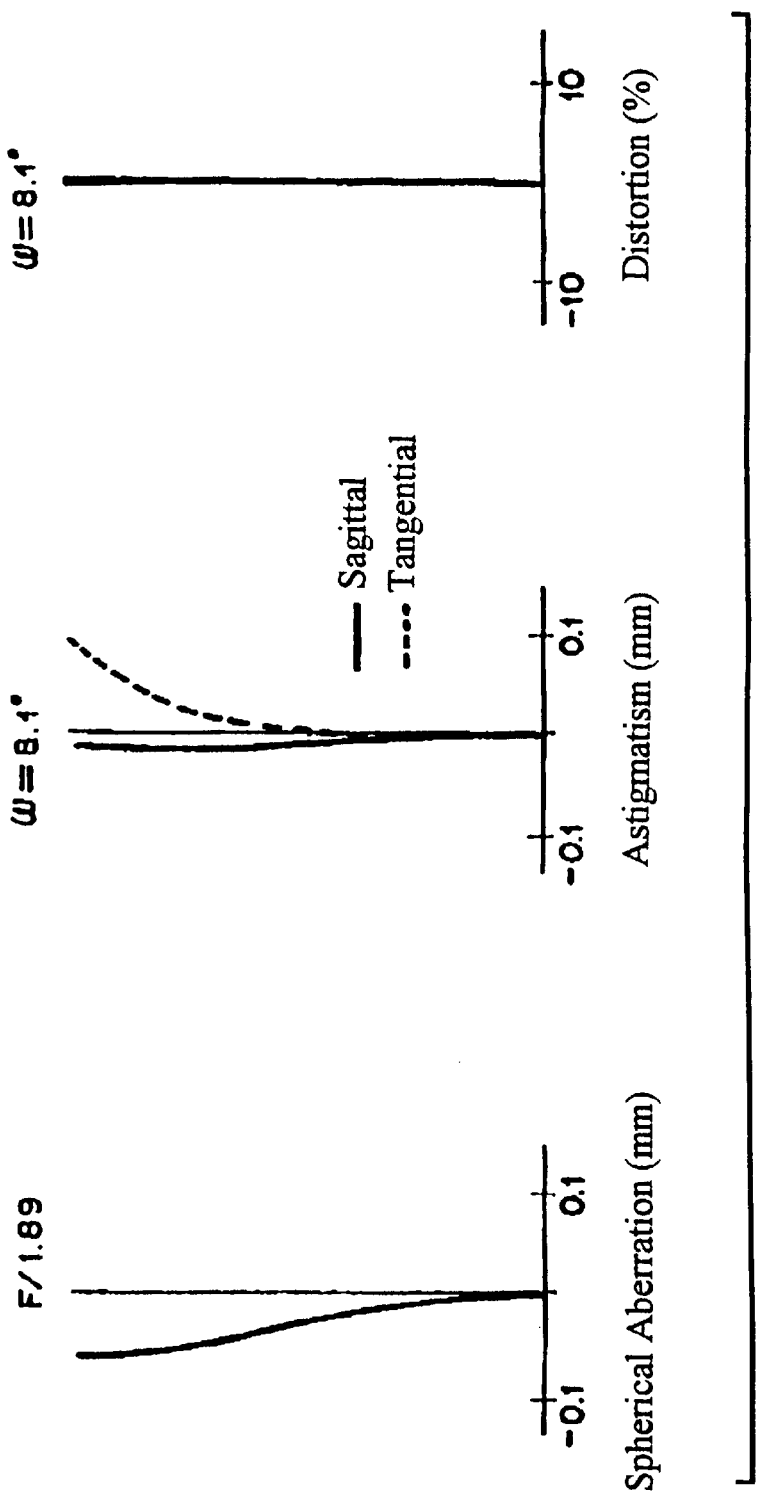
FIG. 6 illustrates aberrations at the middle position of the rear-focus-type zoom lens of Embodiment 2.
Figure 7:
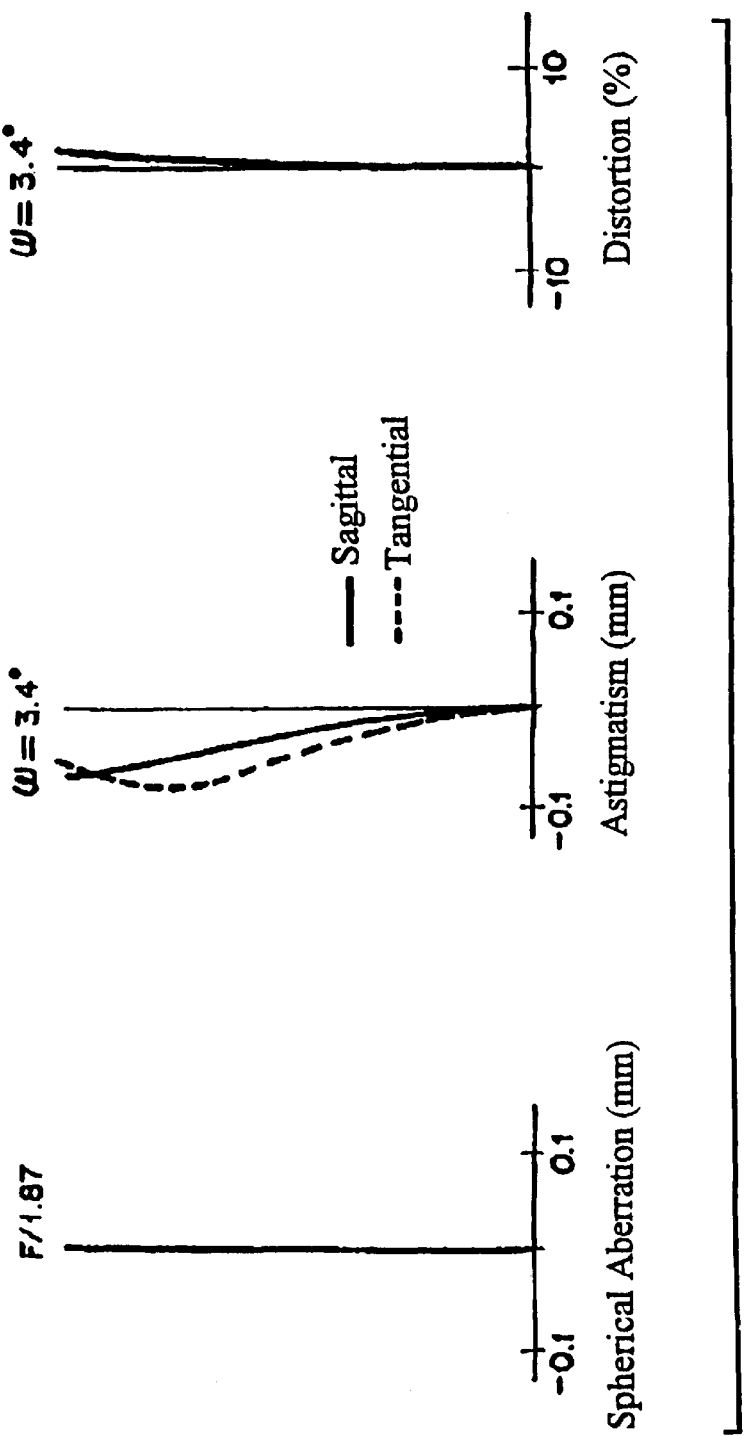
FIG. 7 illustrates aberrations at the telephoto end of the rear-focus-type zoom lens of Embodiment 2.

FIGS. 5–7 show the spherical aberration, astigmatism, and distortion of the rear-focus-type zoom lens of Embodiment 2, with FIG. 5 showing the various aberrations at the wide-angle end (f=5.19 mm), FIG. 6 showing the various aberrations at the mid position (f=20.76 mm), and FIG. 7 showing the various aberrations at the telephoto end (f=49.81 mm). Once again, ω is the half-image angle. Also, in each aberration plot of astigmatism, aberrations are shown for both the sagittal image plane and the tangential image plane.

As listed in Table 2 and shown in FIGS. 5–7, Embodiment 2 satisfies all the Conditions (1)–(4). The focal distance f of the zoom lens is from 5.19–49.81 mm, the f-number $F_{NO}$ is 1.87, and the zoom ratio is as high as 9.6, thereby providing a high-performance, rear-focus-type zoom lens that forms a bright image with aberrations that are favorably corrected.

Embodiment 3

The lens element construction of this embodiment is basically the same as in Embodiment 1, except that in this embodiment: a) the seventh lens element $L_7$ of the third lens group $G_3$ has a positive meniscus shape with its convex surface on the object side, b) the eighth lens element $L_8$ of the fourth lens group $G_4$ has a positive meniscus shape with its convex surface on the object side, and c) the eleventh lens element $L_{11}$ of the fourth lens group $G_4$ is biconvex.

Listed in the top portion of Table 3 are the surface number # in order from the object side, the radius of curvature R (in mm) of each surface, the on-axis surface spacing D (in mm), as well as the index of refraction $N_d$ and the Abbe number $v_d$ (at the sodium d line) of each lens element of Embodiment 3. Listed in the middle portion of Table 3 are the focal distance f (in mm), the $F_{NO}$, and the back focus Bf (in mm). Furthermore, listed in the bottom portion of Table 3 are the values corresponding to Conditions (1)–(4).

TABLE 3

| # | R | D | $N_d$ | $v_d$ |
|---|---|---|---|---|
| 1 | 76.549 | 2.41 | 1.84665 | 23.8 |
| 2 | 37.797 | 8.32 | 1.71299 | 53.8 |
| 3 | −341.777 | 0.19 | | |
| 4 | 34.746 | 4.87 | 1.62041 | 60.3 |
| 5 | 84.466 | 2.87–29.32 | | |
| 6 | −296.681 | 0.94 | 1.83400 | 37.1 |
| 7 | 10.239 | 4.14 | | |
| 8 | −50.201 | 1.28 | 1.51823 | 58.9 |
| 9 | 10.519 | 3.28 | 1.84665 | 23.8 |
| 10 | 32.616 | 28.42–1.97 | | |
| 11 | ∞ (stop) | 1.73 | | |
| 12 | 18.287 | 2.24 | 1.74399 | 44.8 |
| 13 | 100.343 | 4.13–7.61 | | |
| 14 | 17.833 | 4.44 | 1.62041 | 60.3 |
| 15 | 211.808 | 1.38 | | |
| 16 | −21.719 | 7.59 | 1.84665 | 23.8 |
| 17 | 16.579 | 0.54 | | |
| 18 | 44.034 | 2.68 | 1.71299 | 53.8 |
| 19 | −21.104 | 0.20 | | |
| 20 | 15.992 | 2.64 | 1.75500 | 52.3 |
| 21 | −1211.31 | 3.49–0.00 | | |
| 22 | ∞ | 5.00 | 1.51680 | 64.2 |
| 23 | ∞ | | | |

TABLE 3-continued

| | | |
|---|---|---|
| f = 7.71–74.04 | $F_{NO}$ = 2.47 | Bf = 6.13 |
| Condition (1) value: | | Z = 9.6 |
| Condition (2) value: | | $|f_2/(f_W \times f_T)^{0.5}|$ = 0.45 |
| Condition (3) value: | | $f_3/f_4$ = 1.3 |
| Condition (4) value: | | $f_T/F_{T123}$ = 0.44 |

Figure 8:
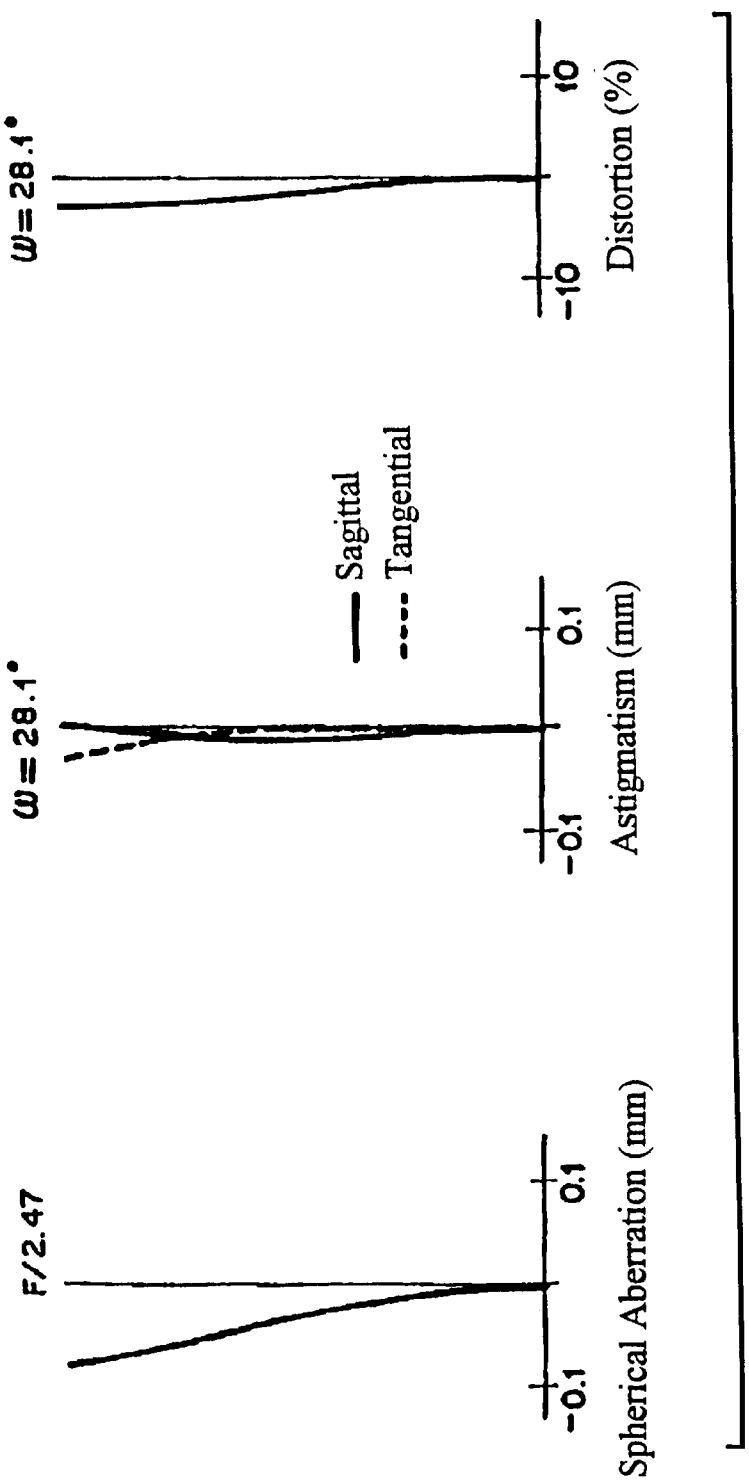
FIG. 8 illustrates aberrations at the wide-angle end of the rear-focus-type zoom lens of Embodiment 3.
Figure 9:
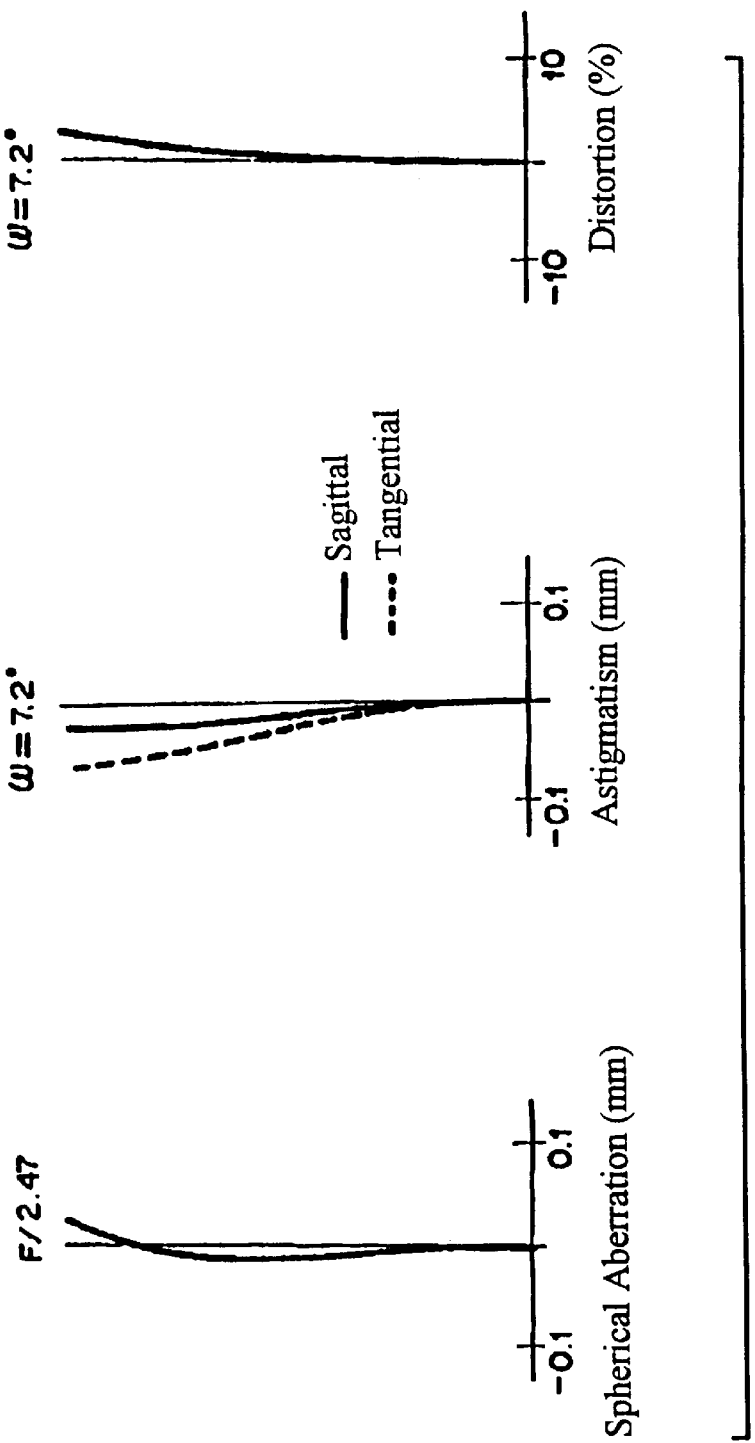
FIG. 9 illustrates aberrations at the middle position of the rear-focus-type zoom lens of Embodiment 3.
Figure 10:
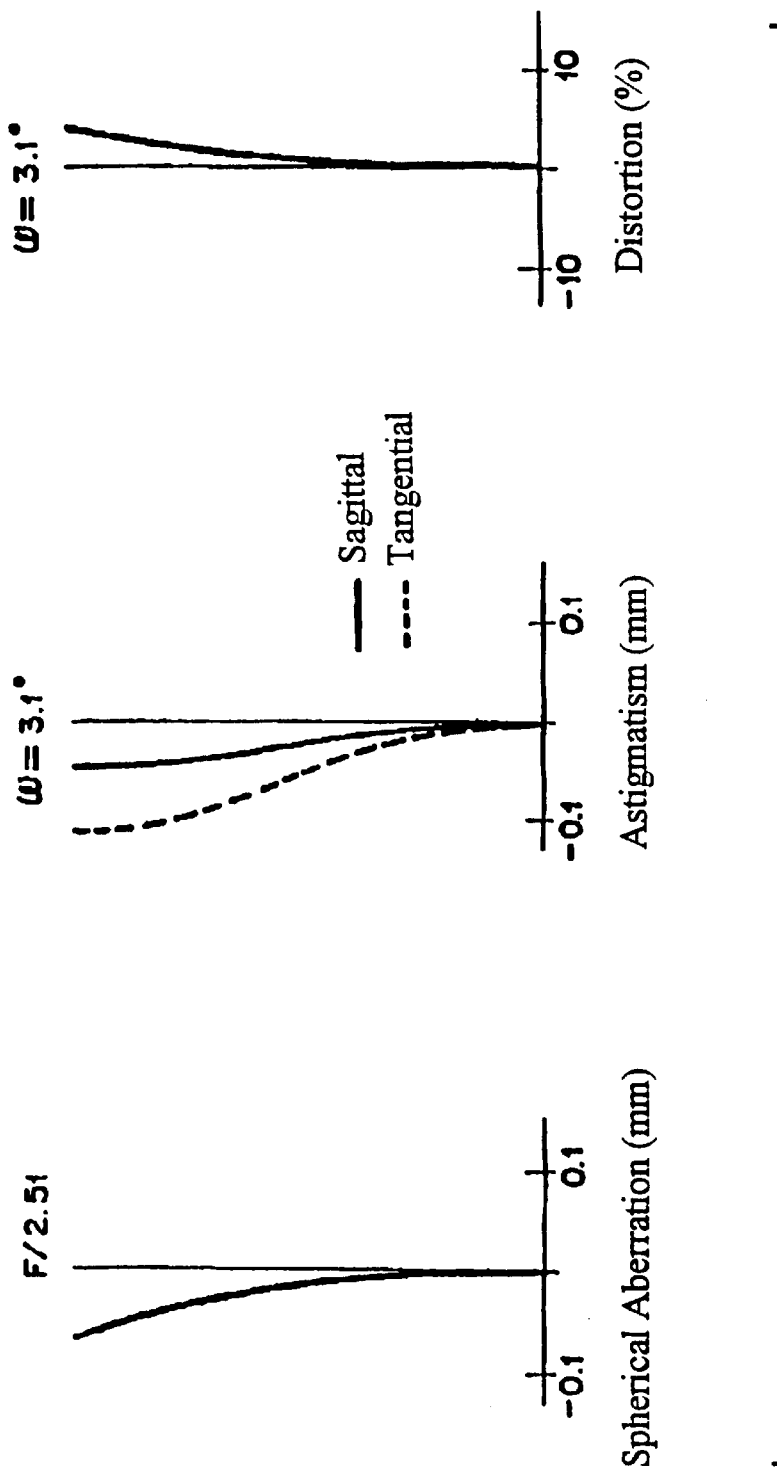
FIG. 10 illustrates aberrations at the telephoto end of the rear-focus-type zoom lens of Embodiment 3.

FIGS. 8–10 show the spherical aberration, astigmatism, and distortion of the rear-focus-type zoom lens of Embodiment 3, with FIG. 8 showing the various aberrations at the wide-angle end (f=7.71 ), FIG. 9 showing the various aberrations at a middle position (f=30.84 mm), and FIG. 10 showing the various aberrations at the telephoto end (f=74.04 mm). Once again, ω is the half-image angle. Also, in each aberration plot of astigmatism, aberrations are shown for both the sagittal image plane and the tangential image plane.

As listed in Table 3 and shown in FIGS. 8–10, Embodiment 3 satisfies Conditions (1)–(4). The focal distance f of the zoom lens is from 7.71–74.04 mm, the f-number $F_{NO}$ is 2.47, and the zoom ratio is as high as 9.6, making it a high-performance rear-focus-type zoom lens that provides a bright image with aberrations that are favorably corrected.

Embodiment 4

Although construction of the rear-focus-type zoom lens of this Embodiment 4 is basically the same as in Embodiment 1, it differs in that: a) the seventh lens element $L_7$ of the third lens group $G_3$ has a positive meniscus shape with its convex surface on the object side; b) the eighth lens element $L_8$ of the fourth lens group $G_4$ has a positive meniscus shape with its convex surface on the object side, and c) the eleventh lens element $L_{11}$ of the fourth lens group $G_4$ is biconvex. Thus, as to the shapes of the lens elements used, this embodiment is identical to that of Embodiment 3.

Listed in the top portion of Table 4 are the surface number # in order from the object side, the radius of curvature R (in mm) of each surface, the on-axis surface spacing D (in mm), as well as the index of refraction $N_d$ and the Abbe number $\nu_d$ (at the sodium d line) of each lens element of Embodiment 4. Listed in the middle portion of Table 4 are the focal distance f (in mm), the f-number $F_{NO}$ and the back focus Bf (in mm). Furthermore, listed in the bottom portion of Table 4 are the values corresponding to Conditions (1)–(4).

TABLE 4

| # | R | D | $N_d$ | $\nu_d$ |
|---|---|---|---|---|
| 1 | 66.832 | 3.00 | 1.84665 | 23.8 |
| 2 | 35.296 | 8.70 | 1.71299 | 53.8 |
| 3 | –405.213 | 0.18 | | |
| 4 | 35.301 | 4.58 | 1.62041 | 60.3 |
| 5 | 76.398 | 3.04–29.03 | | |
| 6 | –245.608 | 1.06 | 1.83400 | 37.1 |
| 7 | 10.163 | 4.28 | | |
| 8 | –49.861 | 1.78 | 1.51823 | 58.9 |
| 9 | 10.388 | 3.21 | 1.84665 | 23.8 |
| 10 | 29.847 | 27.77–1.78 | | |
| 11 | ∞ (stop) | 0.98 | | |
| 12 | 19.138 | 1.54 | 1.74399 | 44.8 |
| 13 | 100.285 | 4.88–7.61 | | |
| 14 | 17.34 | 4.13 | 1.62041 | 60.3 |
| 15 | 263.633 | 2.14 | | |
| 16 | –21.523 | 7.47 | 1.84665 | 23.8 |
| 17 | 16.714 | 0.56 | | |
| 18 | 44.341 | 2.51 | 1.71299 | 53.8 |
| 19 | –21.006 | 0.35 | | |
| 20 | 15.743 | 2.69 | 1.75500 | 52.3 |
| 21 | –896.575 | 2.73–0.00 | | |
| 22 | ∞ | 5.00 | 1.51680 | 64.2 |
| 23 | ∞ | | | |
| f = 7.77–74.63 | $F_{NO}$ = 2.47 | Bf = 6.84 | | |
| Condition (1) value: | | Z = 9.6 | | |
| Condition (2) value: | | $|f_2/(f_W \times f_T)^{0.5}|$ = 0.43 | | |
| Condition (3) value: | | $f_3/f_4$ = 1.5 | | |
| Condition (4) value: | | $f_T/F_{T123}$ = 0.36 | | |

Figure 11:
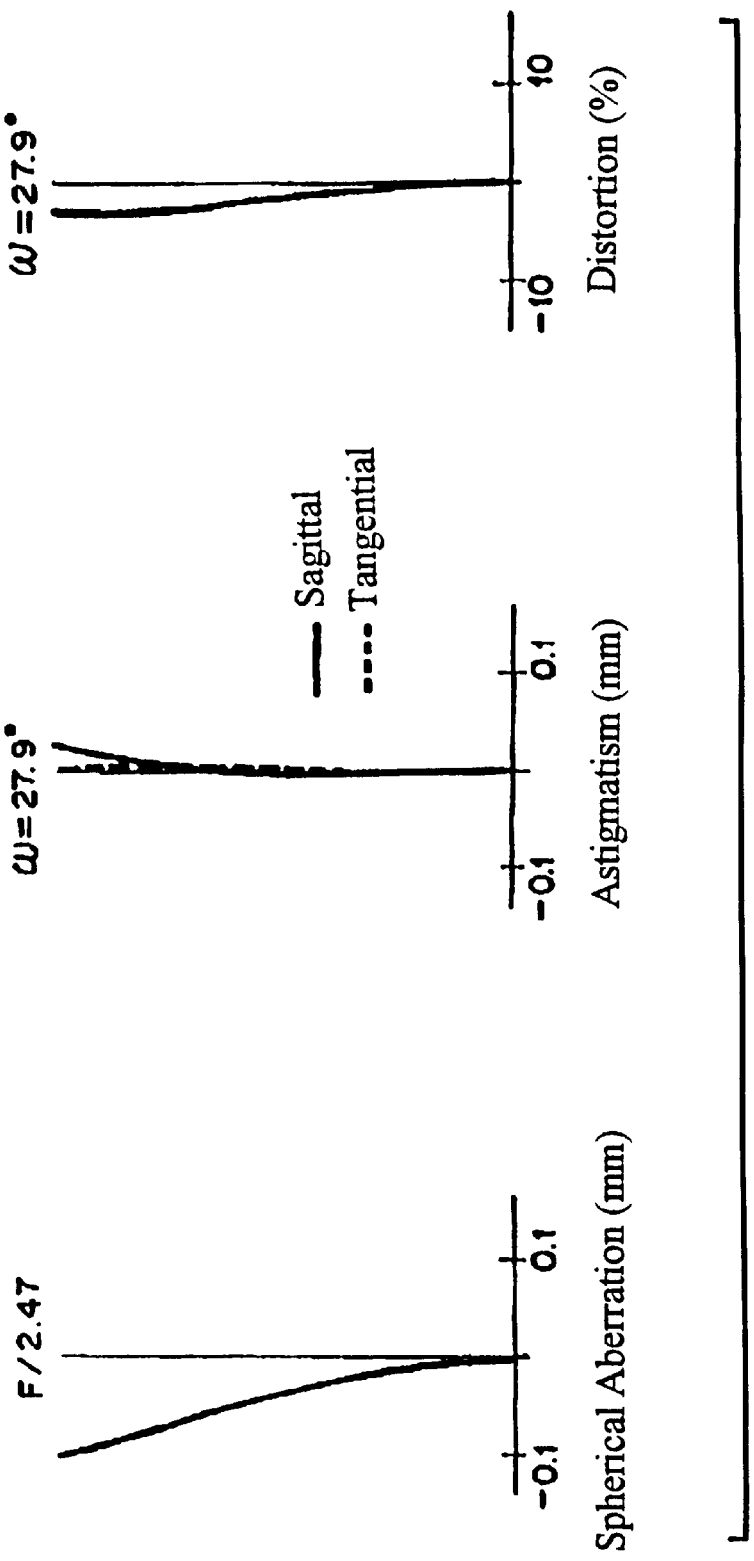
FIG. 11 illustrates aberrations at the wide-angle end of the rear-focus-type zoom lens of Embodiment 4.
Figure 12:
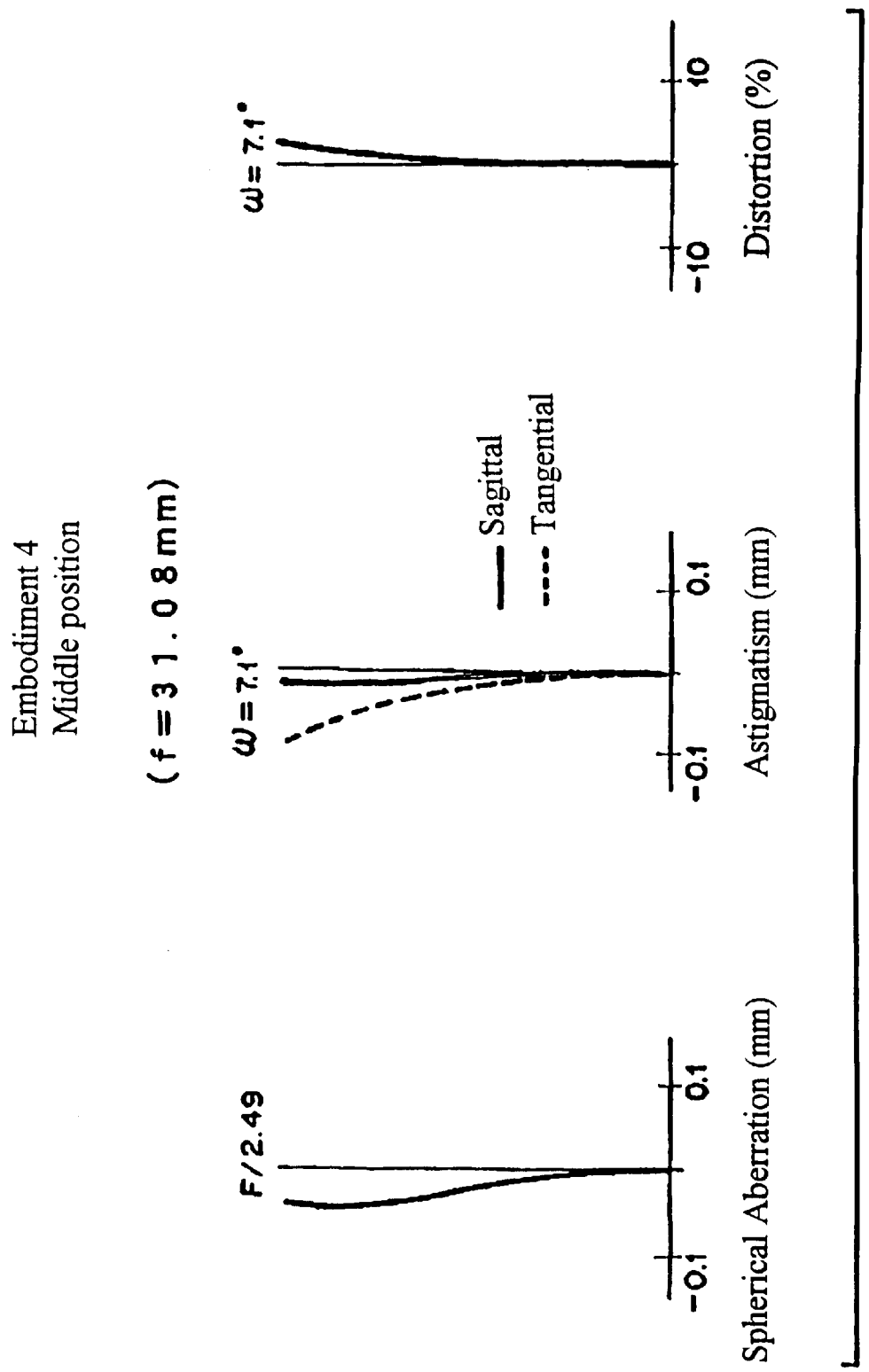
FIG. 12 illustrates aberrations at the middle position of the rear-focus-type zoom lens of Embodiment 4.
Figure 13:
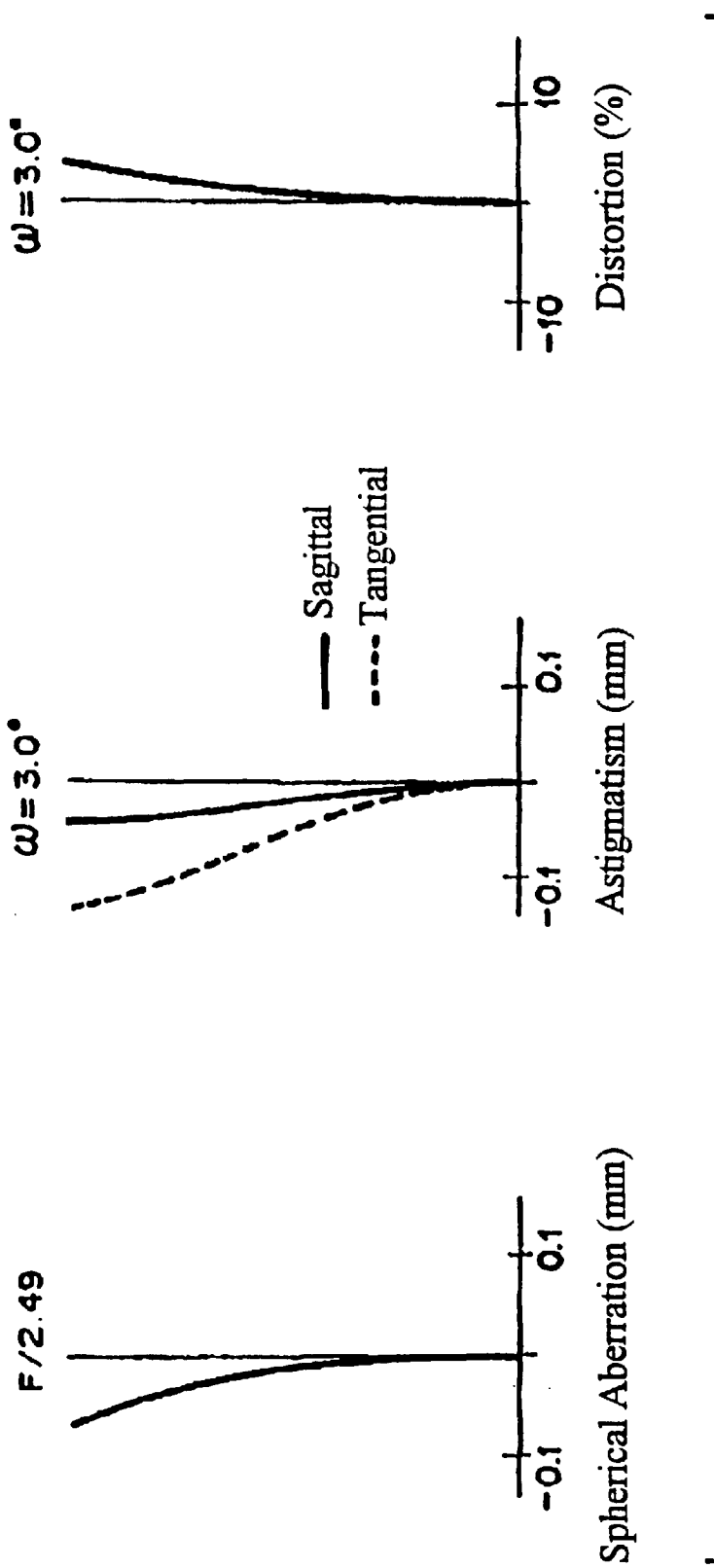
FIG. 13 illustrates aberrations at the telephoto end of the rear-focus-type zoom lens of Embodiment 4.

FIGS. 11–13 show the spherical aberration, astigmatism, and distortion of the rear-focus-type zoom lens of Embodiment 4, with FIG. 11 showing the various aberrations at the wide-angle end (f=7.77 mm), FIG. 12 showing the various aberrations at a mid-position (f=31.08 mm), and FIG. 13 showing the various aberrations at the telephoto end (f=74.63 mm). Once again, ω indicates the half-image angle. Also, in each aberration plot of astigmatism, aberrations are shown for both the sagittal image plane and the tangential image plane.

As listed in Table 4 and shown in FIGS. 11–13, Embodiment 4 satisfies Conditions (1)–(4). The focal distance f of the zoom lens is 7.77–74.63 mm, the f-number $F_{NO}$ is 2.47, and the zoom ratio is as high as 9.6, making it a high-performance rear-focus-type zoom lens that provides a bright image with aberrations that are favorably corrected.

As explained above, in the rear-focus-type Zoom lens of this invention, the first lens group can be made to have a large diameter by fixing the first lens group during zooming. Even when the diameter of the first lens group $G_1$ is made large as in this case, the various aberrations can be favorably corrected over the entire range of zoom and for all object distances, and a zoom lens with a zoom ratio as high as about 10 that provides a bright image can be obtained. Thus, the rear-focus-type zoom lens of the present invention has a high optical performance, a high zoom ratio, and yet is compact and lightweight, thereby satisfying the popularly demanded features for video cameras.

The invention being thus described, it will be obvious that the same may be varied in many ways. For example, although the zoom ratio is set to 9.6 in each of the above embodiments, the zoom ratio can alternatively be set to 10, 11 or 12. Such variations are not to be regarded as a departure from the spirit and scope of the invention. Rather the scope of the invention shall be defined as set forth in the following claims and their legal equivalents. All such modifications as would be obvious to one skilled in the art are intended to be included within the scope of the following claims.

What is claimed is:

1. A rear-focus-type zoom lens comprising four lens groups of positive, negative, positive and positive refractive power, respectively, the first lens group and the third lens group being fixed relative to an image surface of the zoom lens, zooming is accomplished by moving the second lens group and the fourth lens group along the optical axis, and focusing is accomplished by moving the fourth lens group along the optical axis, wherein:

the first lens group is formed of, in sequential order from the most object side, a first lens formed of a negative lens element and a positive lens element that are joined, and a second lens which consists of a single lens element of positive refractive power;

the second lens group is formed of, in sequential order from the object side, a third lens which consists of a single lens element of negative refractive power, and a fourth lens formed of, in order from the object side, a negative lens element joined with a positive lens element; and the third lens group consists of a single lens element; and the fourth lens group is formed of, in sequential order from the object side, a lens element of positive refractive power, a lens element of negative refractive power, a lens element of positive refractive power, and a lens element of positive refractive power.

2. The rear-focus-type zoom lens of claim 1, wherein the zoom ratio, defined by the focal length of the zoom lens at the telephoto end divided by the focal length of the zoom lens at the wide-angle end, is greater than 9.5.

3. The rear-focus-type zoom lens of claim 1, wherein the following condition is satisfied:

$$0.4 < |f_2/(f_W \times f_T)^{0.5}| < 0.64$$

where $f_2$ is the focal distance of the second lens group, $f_W$ is the focal distance of the zoom lens at the wide-angle end, and $f_T$ is the focal distance of the zoom lens at the telephoto end.

4. The rear-focus-type zoom lens of claim 1, wherein the following condition is satisfied:

$$1.0 < f_3/f_4 < 6.0$$

where $f_3$ is the focal distance of the third lens group and $f_4$ is the focal distance of the fourth lens group.

5. The rear-focus-type zoom lens of claim 1, wherein the following condition is satisfied:

$$-0.25 < f_T/F_{T123} < 0.50$$

where $f_T$ is the focal length of the zoom lens at the telephoto end, and $F_{T123}$ is the composite focal distance of the first, second, and third lens groups at the telephoto end.

6. A rear-focus-type zoom lens comprising, in order from the object side: four lens groups of positive, negative, positive and positive refractive power, respectively, the first lens group and the third lens group being fixed relative to an image surface of the zoom lens, zooming is accomplished by moving the second lens group and the fourth lens group along the optical axis, and focusing is accomplished by moving the fourth lens group along the optical axis, wherein:

the first lens group is formed of, in sequential order from the most object side, a negative lens element, a positive lens element, and a positive lens element;

the second lens group is formed of, in sequential order from the object side, a lens element of negative refractive power, and a joined lens formed of a negative lens element that is joined to a positive lens element;

the third lens group consists of a single lens element of positive refractive power; and the fourth lens group is formed of, in sequential order from the object side, a lens element of positive refractive power, a lens element of negative refractive power, a lens element of positive refractive power, and a lens element of positive refractive power;

the zoom ratio, defined by the focal length of the zoom lens at the telephoto end divided by focal length of the zoom lens at the wide-angle end, is greater than 9.5, and the following condition is satisfied:

$$0.4 < |f_2/(f_W \times f_T)^{0.5}| < 0.64$$

where $f_2$ is the focal distance of the second lens group, $f_W$ is the focal distance of the zoom lens at the wide-angle end, and $f_T$ is the focal distance of the zoom lens at the telephoto end.

7. The rear-focus-type zoom lens of claim 6, wherein the following condition is satisfied:

$$1.0 < f_3/f_4 < 6.0$$

where $f_3$ is the focal distance of the third lens group and $f_4$ is the focal distance of the fourth lens group.

8. The rear-focus-type zoom lens of claim 6, wherein the following condition is satisfied:

$$-0.25 < f_T/F_{T123} < 0.50$$

where $f_T$ is the focal length of the zoom lens at the telephoto end, and $F_{T123}$ is the composite focal distance of the first, second, and third lens groups at the telephoto end.

9. The rear-focus-type zoom lens of claim 6, wherein each lens element of the fourth lens group is separated by air from each adjacent lens element.

* * * * *

UNITED STATES PATENT AND TRADEMARK OFFICE
CERTIFICATE OF CORRECTION

PATENT NO. : 6,320,701 B1
DATED : November 20, 2001
INVENTOR(S) : Takatsuki

It is certified that error appears in the above-identified patent and that said Letters Patent is hereby corrected as shown below:

<u>Column 1,</u>
Line 13, change "Zoom" to -- zoom --;

<u>Column 3,</u>
Line 54, change "10x," to -- 10x, --; and

<u>Column 8,</u>
Line 26, change "Zoom" to -- zoom --.

Signed and Sealed this

Twelfth Day of March, 2002

Attest:

*Attesting Officer*

JAMES E. ROGAN
*Director of the United States Patent and Trademark Office*